June 20, 1933.    A. ROSNER    1,915,003
CONDUIT
Filed March 11, 1929
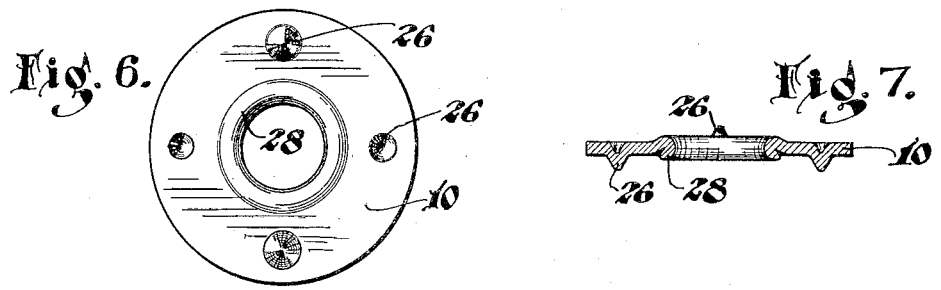
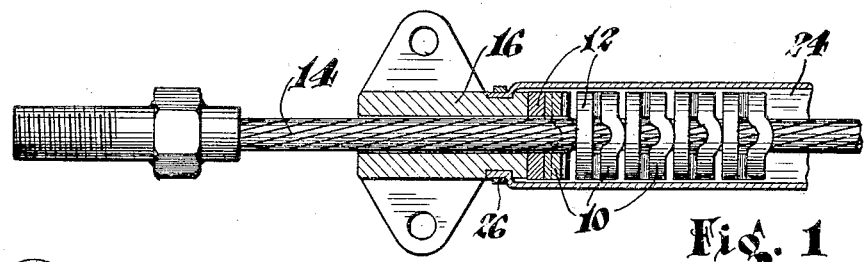
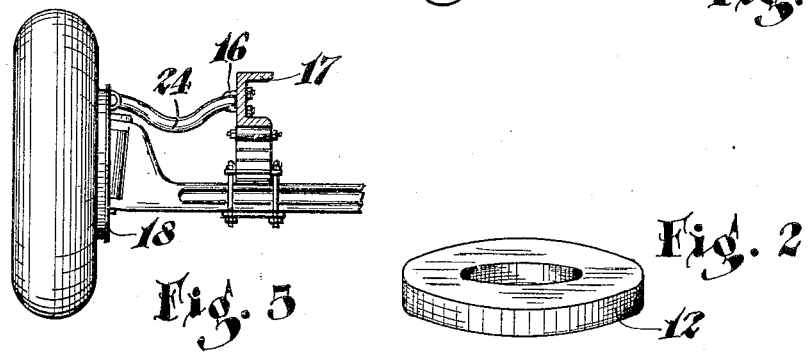
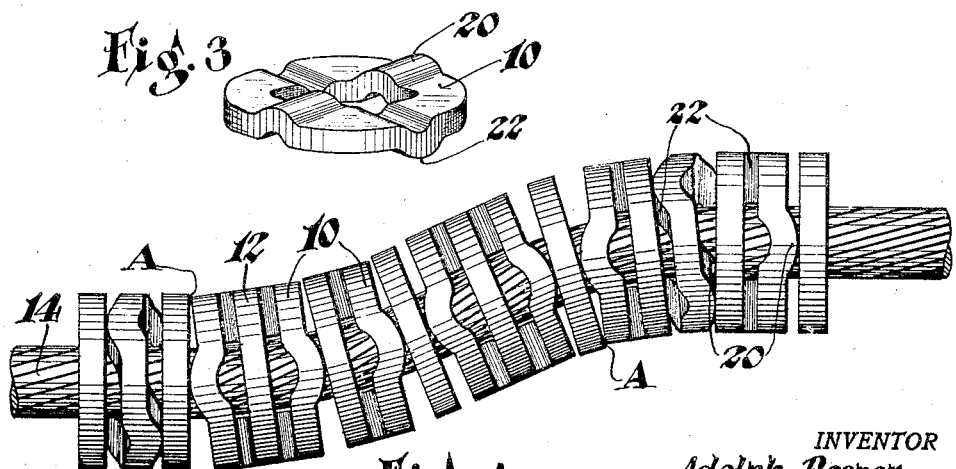
INVENTOR
Adolph Rosner
BY H. O. Clayton
ATTORNEY Patented June 20, 1933

1,915,003

UNITED STATES PATENT OFFICE

ADOLPH ROSNER, OF SOUTH BEND, INDIANA, ASSIGNOR TO BENDIX BRAKE COMPANY, OF SOUTH BEND, INDIANA, A CORPORATION OF ILLINOIS

CONDUIT

Application filed March 11, 1929. Serial No. 346,065.

This invention relates to flexible power transmission devices and more particularly to improvements in the casings of such devices.

An object of the invention is to provide a flexible conduit which houses a flexible power transmission element wherein the conduit maintains a fixed length despite its change of shape due to flexing, and which functions to resist compression under the action of the power transmission element passing therethrough.

In the accomplishment of the above, there is provided a flexible conduit comprising a plurality of disklike steel stampings or the like, each provided with relatively narrow embossments extending across the face thereof, and which embossed stampings are spaced by flat washer members. Each disk is preferably provided with an embossment on each side face thereof, the two embossments on each disk best being at right angles to each other, and the several disks and washers may be threaded on to the cable tension element in face-to-face contact between two end fittings, and further covered, if desired, by a tubular casing secured to said fittings and which may be arranged to retain a lubricant.

Further desirable details of construction and meritorious features of the invention will become apparent from the following detailed description of the preferred embodiment of my invention disclosed in the accompanying drawing, in which:

Figure 1 is a partial plan view of my novel conduit with the flexible tension element passing therethrough, parts of the conduit being shown in longitudinal section;

Figures 2 and 3 are perspective views disclosing respectively a spacing washer and an embossed stamping which make up the body of the conduit;

Figure 4 is a fragmentary plan of the conduit showing the indeterminate position assumed by the disk body members when the same is flexed;

Figure 5 is a diagrammatic view showing the conduit incorporated as part of the control for the brake of an automobile front wheel; and Figures 6 and 7 indicate respectively in plan and section a modified form of embossed stamping.

In the preferred embodiment of my invention I have constructed a conduit comprising a plurality of juxtaposed disklike steel stampings 10 spaced by flat-faced washer members 12, both types of conduit elements being provided with substantially circular openings at their centers to thread the elements on a flexible power transmission tension element such as a wire cable 14. The conduit elements are preferably in face-to-face contact with one another and are interposed, in this relation, between tubular end fittings 16 which may be secured respectively to the chassis frame 17 and the brake support plate 18 of the front wheel of a motor vehicle.

According to an important feature of my invention, the flexible characteristic of my conduit member is obtained by providing the elements 10 with diametrically extending relatively narrow embossments 20 and 22 pressed outwardly from the opposite side faces thereof, all as clearly disclosed in Figure 3. I prefer that the embossments extend at right angles to each other and that they present rounded outer surfaces as disclosed.

The several conduit-forming elements may be covered with a tight fitting grease-retaining flexible tubular housing 24 preferably permanently secured as by a clamping ring 26 to the end fittings 16. Housing 24, together with its attached end fittings and enclosed conduit elements, constitutes a sub-assembly unit which may be handled as a one-piece member. The cable is easily threaded into the conduit and the casing 24 performs the useful function of a grease retainer, as well as a casing for the conduit elements.

The several elements 10 and their spacers 12 mutually co-operate to insure a flexing of the conduit without change of its length, the elements 10 acting as miniature universal joints between their juxtaposed flat washers. The embossments 20 and 22 serve to permit a rocking of the disks 10 on the flat-faced washers 12 about axes extending in all directions parallel to the plane of the disks, as shown in Figure 4. This result is effected, inasmuch as the many embossed disks are freely rotatable between their spacers and float, so to speak, between said spacers, no definite arrangement existing between the parts.

A further feature of my invention lies in the predetermination of the degree of flexing, inasmuch as the height of the embossments or ribs in the disk elements determines the minimum radius to which the conduit may be bent without changing its length. This is clearly disclosed in Figure 4 showing the disks 10 rocked about axes passing through the axis of the cable, the movement being limited by the contact of the disks with the adjacent washers at points A, Figure 4. Undesirable sharp bends in the conduit are thus avoided.

With tensioning of the power transmission cable, a load is placed upon the normally flexed conduit which is forthwith placed in compression, the cable tending to straighten the conduit. It is the desideration that the conduit maintain its fixed length under such compressive strain and, with the instant invention, this is assured inasmuch as all of the solid conduit elements always remain in contact one with another and the end elements are in constant contact with the end fittings. This action is furthermore assured due to the fact that the conduit elements rock about transverse axes all of which intersect the conduit axis. The air spaces between the juxtaposed conduit elements form pockets for the lubricant within the cover 24, which lubricant reduces friction and the resulting wear of the parts.

As a modification of my invention, the ribs 20 and 22 may be replaced by hemispherical embossments 26, two of which may be diametrically aligned on each side of the alternate stampings. The central cable openings in these members may be provided with curved flanges 28 which facilitate the bending action of the cable rocking thereon. The flexing of the conduit with this modification is effected in the same manner as heretofore described, the embossments 26 providing a two-point support for the rocking action of the stampings 10 on the plain washers 12.

My novel conduit is shown incorporated in a front wheel brake control, although it is obvious that its use is not limited to such a structure for it may be employed as a housing for any flexible power transmission member wherein change of direction of the member is desired without a change in length thereof between the driving and driven members secured thereto.

While two illustrative embodiments have been described in detail, it is not my intention to limit the scope of the invention to the particular embodiments described, or otherwise than by the terms of the appended claims.

I claim:

1. Power transmission mechanism comprising a flexible and substantially incompressible conduit including a plurality of contacting washers some of which have transverse ribs rockably engaging the adjacent washers, the ribs extending diametrically in alignment and to opposite edges of the washer.

2. A flexible conduit comprising apertured disklike elements in single line contact one with another.

3. A flexible conduit comprising apertured disklike elements in single line contact one with another, in combination with a flexible tension element passing through the apertures in said elements.

4. A flexible conduit including a plurality of curved surfaced and apertured members spaced by entirely plane faced members, all of said members having line contact one with another and rockable about axes extending normal to the longitudinal axis of the conduit.

5. Power transmission mechanism comprising a flexible conduit including end fittings separated in part by rockably-engaging washer members in single line contact.

6. A flexible conduit comprising entirely plane faced washer members spaced by members having curved surfaces.

7. A flexible conduit comprising entirely plane faced washer members spaced by apertured embossed disklike members, said embossed members having their embossments extending from opposite faces thereof to contact said washer members.

8. A flexible conduit comprising washer members spaced by embossed disklike members, said embossed members having opposed parallel faces and having their embossments at right angles to each other and extending from said opposite faces thereof to contact said washer members.

9. Transmission mechanism comprising a flexible conduit formed of a plurality of relatively movable apertured elements, each element having a single line contact with one of the other elements along a diametric line.

10. A flexible conduit comprising a plurality of juxtaposed embossed and apertured elements and having entirely plane faced elements between the embossed elements.

11. A flexible conduit comprising a plurality of contacting disklike elements constructed and arranged to predetermine the degree of flexing of said conduit, said elements having circular surfaces, each of which surfaces has a diametrical single line contact with the surface of the adjacent element.

In testimony whereof, I have hereunto signed my name.

ADOLPH ROSNER.

CERTIFICATE OF CORRECTION.

Patent No. 1,915,003.  June 20, 1933.

ADOLPH ROSNER.

It is hereby certified that error appears in the printed specification of the above numbered patent requiring correction as follows: Page 2, lines 91 and 94, claims 2 and 3, respectively, after "elements" insert "each"; and lines 92 and 95, same claims, strike out the word "one"; same page, lines 107 and 108, claim 5, strike out the compound word "rockably-engaging"; and that the said Letters Patent should be read with these corrections there in that the same may conform to the record of the case in the Patent Office.

Signed and sealed this 26th day of September, A. D. 1933.

F. M. Hopkins (Seal)  Acting Commissioner of Patents.